W. V. WALLACE.
Car Coupling.
No. 89,525.
Patented April 27, 1869.
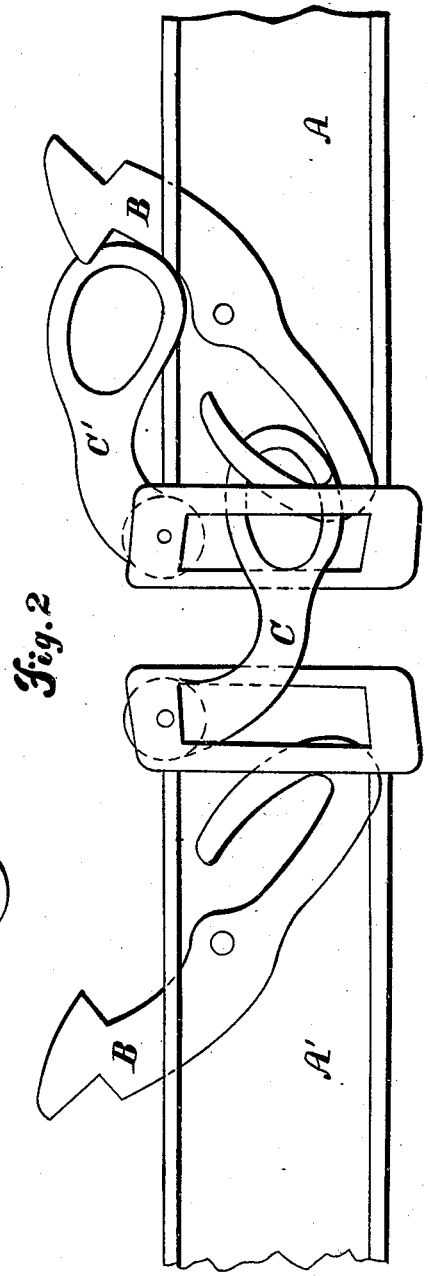
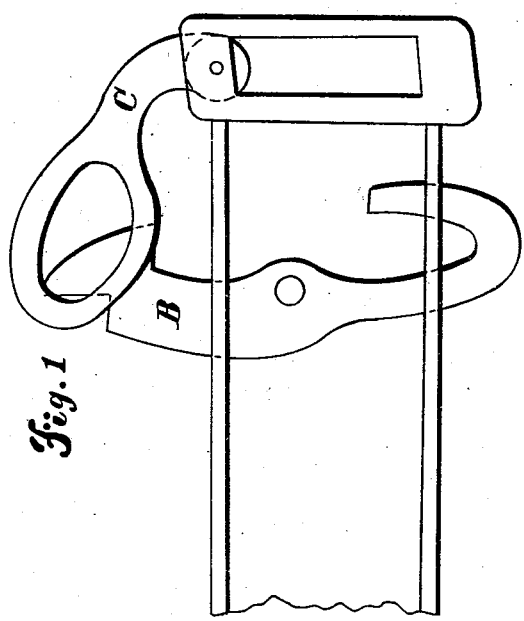
Witnesses:
Inventor.
William V. Wallace

WILLIAM V. WALLACE, OF NEW YORK, N. Y.

Letters Patent No. 89,525, dated April 27, 1869.

IMPROVED CAR-COUPLING.

The Schedule referred to in these Letters Patent and making part of the same.

*To all whom it may concern:*

Be it known that I, WILLIAM V. WALLACE, of the city, county, and State of New York, have invented a new and useful Improvement in Railway-Car Couplings; and I do hereby declare that the following is a full and exact description thereof, reference being had to the accompanying drawings, making a part of this specification, and to the letters of reference marked thereupon.

The nature of my invention consists in the construction of a car-coupling, that will make its connection automatically, and so constructing the link and hook, that they may be always held firmly and safely in their proper position, without being liable to become detached in any way from the car-bunter, and always ready for use.

To enable others skilled in the art to make and use my invention, I do hereby declare that the following is a full, clear, and exact description of the same.

Figure 1 is a side view of one section of my car-coupling, and

Figure 2 shows the two parts of the same when connected.

In the drawings—

The letter A represents the car-bunter, constructed in the usual form, to which and within which my coupling is attached.

B represents the hook and trigger, made in one piece, and pivoted centrally within the bunter-head. The upper part of said hook is made so much heavier than the lower part, that its tendency is to keep the hook elevated, to retain the link, as shown plainly in fig. 2.

The link C is made in one piece, and the looped portion is made nearly at right angles with that part of it that is pivoted to the upper portion of the bunter.

When it is desired to couple the two cars together, the link is thrown forward, as represented in fig. 2, A'.

By reason of its peculiar form and construction, it is, in that position, properly adjusted to enter the opposide bunter, and connect with the hook B, while the opposite link, C', is turned in the opposite direction, and falls under a notch cut in the head of the hook B, tending to prevent the cars from becoming uncoupled.

When desired, as would be the case when the coupling is not in use, the link C can be turned backward, and falling over the rear of the upper part of the hook B, will, from the peculiar construction of the latter, hold the hook in a nearly vertical position.

When the cars are to be coupled, there is no liability of danger of the operator being crushed between the cars, as the whole apparatus is so arranged as to be self-adjusting, by any person standing upon the car-platform.

This coupling is made of iron, and economically manufactured, and should any of the parts get broken or disarranged, can be easily renewed, on account of the simplicity of construction and adjustment.

I do not claim separately, either the link or hook; but

What I do claim, and desire to secure by Letters Patent, is—

1. The construction and arrangement of a car-coupling, in the manner and for the purpose herein described.

2. The combination of the link C and hook B, in the manner and for the purpose herein described.

3. The link C, when constructed as herein shown and described, with a hook, weighted at its upper end, and pivoted centrally within the opposite bunter, as herein specified.

WILLIAM V. WALLACE.

Witnesses:
 B. F. JAMES,
 J. C. LATHROP.